United States Patent
Igarashi

(10) Patent No.: US 11,680,822 B2
(45) Date of Patent: Jun. 20, 2023

(54) APPARATUS AND METHODS FOR MANAGING MAPS

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 17/238,348

(22) Filed: Apr. 23, 2021

(65) Prior Publication Data

US 2021/0333125 A1 Oct. 28, 2021

(30) Foreign Application Priority Data

Apr. 27, 2020 (JP) .............................. JP2020-078512

(51) Int. Cl.
   *G01C 21/00* (2006.01)
(52) U.S. Cl.
   CPC ..... *G01C 21/3874* (2020.08); *G01C 21/3804* (2020.08)
(58) Field of Classification Search
   CPC .... G01C 21/3804; G01C 21/387–3881; G01C 21/3889
   See application file for complete search history.

(56) References Cited

U.S. PATENT DOCUMENTS

| | | | |
|---|---|---|---|
| 2001/0003169 A1 | 6/2001 | Kaneko et al. | |
| 2004/0002812 A1* | 1/2004 | Yamanaka | G01C 21/387 340/995.14 |
| 2008/0319641 A1* | 12/2008 | Mutoh | G01C 21/32 701/532 |
| 2012/0078512 A1* | 3/2012 | Schunder | G01C 21/3881 701/446 |
| 2013/0332069 A1 | 12/2013 | Schunder et al. | |
| 2014/0005924 A1* | 1/2014 | Letz | G01C 21/343 701/424 |
| 2020/0003566 A1 | 1/2020 | Hosokawa et al. | |
| 2021/0179138 A1* | 6/2021 | Terazawa | B60W 60/001 |

FOREIGN PATENT DOCUMENTS

| | | |
|---|---|---|
| JP | 2002-62144 A | 2/2002 |
| JP | 2007-163166 A | 6/2007 |
| JP | 2009-003350 A | 1/2009 |
| JP | 2014-016713 A | 1/2014 |
| JP | 2018-205093 A | 12/2018 |

* cited by examiner

Primary Examiner — Aaron L Troost
(74) Attorney, Agent, or Firm — Sughrue Mion, PLLC

(57) ABSTRACT

An apparatus for managing maps is provided. The apparatus includes a processor configured to estimate a usage frequency of each of maps stored in a memory included in a vehicle and used for automated driving control of the vehicle, based on section information indicating sections used for automated driving control in each of the maps; and delete, from the memory, a map whose usage frequency is less than a frequency threshold.

6 Claims, 9 Drawing Sheets

FIG. 6

| ID | MAP NAMES | VERSIONS | NUMBERS OF USES | TOTAL DISTANCES | NUMBERS OF SWITCHES | FREQUENCIES OF USE |
|----|-----------|----------|-----------------|-----------------|---------------------|---------------------|
| 1 | MAP1 | V1.0 | 10 | 150 | 3 | 13.5 |
| 2 | MAP2 | V1.0 | 5 | 50 | 5 | 0.6 |
| 3 | MAP3 | V1.1 | 15 | 170 | 0 | 32.4 |
| 4 | MAP4 | V1.2 | 8 | 30 | 2 | 2.3 |
| 5 | MAP5 | V2.0 | 20 | 200 | 8 | 30.1 |
| ... | ... | ... | ... | ... | ... | |

521

APPARATUS AND METHODS FOR MANAGING MAPS

CROSS-REFERENCE TO RELATED APPLICATION

This application claims priority to Japanese Patent Application No. 2020-078512 filed on Apr. 27, 2020, and is incorporated herein by reference in its entirety.

FIELD

The present disclosure relates to an apparatus and a method for managing maps.

BACKGROUND

It is desirable that high-precision maps to which an automated vehicle-driving system refers to perform automated driving control of a vehicle should accurately represent information on road environment. To this end, it has been proposed that a server updates a map whenever necessary, and that an automated vehicle-driving system uses a map downloaded from the server.

Japanese Unexamined Patent Publication No. 2018-205093 (hereafter, "Patent Literature 1") describes an automated driving system that uses high-precision maps. This system compares a road structure map stored in a vehicle with a map in a server when not performing automated driving, and obtains update data from the server and updates the road structure map if it is determined that the version of the road structure map is not latest.

SUMMARY

It is desirable that an automated driving system should make efficient use of a storage area of high-precision maps in a vehicle. The automated driving system in Patent Literature 1 does not necessarily make efficient use of a storage area in view of performing automated driving.

It is an object of the present disclosure to provide an apparatus that manages maps while making efficient use of a storage area of the maps in a vehicle.

An apparatus for managing maps is provided. The apparatus includes a processor configured to estimate a usage frequency of each of maps stored in a memory included in a vehicle and used for automated driving control of the vehicle, based on section information indicating sections used for automated driving control in each of the maps; and delete, from the memory, a map whose usage frequency is less than a frequency threshold.

The processor is preferably further configured to determine whether a section map including sections in a travel route is stored in the memory, before starting automated driving along the travel route; obtain, when the section map is not stored in the memory, the section map together with version information indicating a version of the section map from a server and store the section map and the version information in the memory; and obtain, when the section map is stored in the memory and version information of the section map stored in the server indicates a newer version than version information of the section map stored in the memory, a difference between the section map stored in the memory and the section map stored in the server from the server and store, in the memory, the difference together with the version information of the section map stored in the server.

Preferably, the shorter a total distance traveled by using one of the maps for automated driving control, the lower the processor estimates the usage frequency of the one of the maps.

Preferably, the greater a ratio of the number of switches from automated driving control to manual driving during use of one of the maps to the number of uses of the one of the maps for automated driving control, the lower the processor estimates the usage frequency of the one of the maps.

The processor is preferably further configured to select such sections included in a map stored in the memory as to connect from a start point to an end point, thereby generating the travel route.

A method for managing maps is also provided. The method includes the steps of estimating a usage frequency of each of maps stored in a memory included in a vehicle and used for automated driving control of the vehicle, based on section information indicating sections used for automated driving control in each of the maps; and deleting, from the memory, a map whose usage frequency is less than a frequency threshold.

The apparatus for managing maps can make efficient use of a storage area of the maps in a vehicle.

BRIEF DESCRIPTION OF DRAWINGS

FIG. 6 illustrates an example of a map management table.

DESCRIPTION OF EMBODIMENTS

Hereinafter, an apparatus for managing maps will be explained in detail with reference to the accompanying drawings. The apparatus estimates a usage frequency of each of high-precision maps (hereafter simply "maps") that are stored in a memory included in a vehicle and used for automated driving control of the vehicle, based on section information indicating sections used for automated driving control in each of the maps. The apparatus then deletes, from the memory, a map whose usage frequency is less than a frequency threshold.

Figure 1:
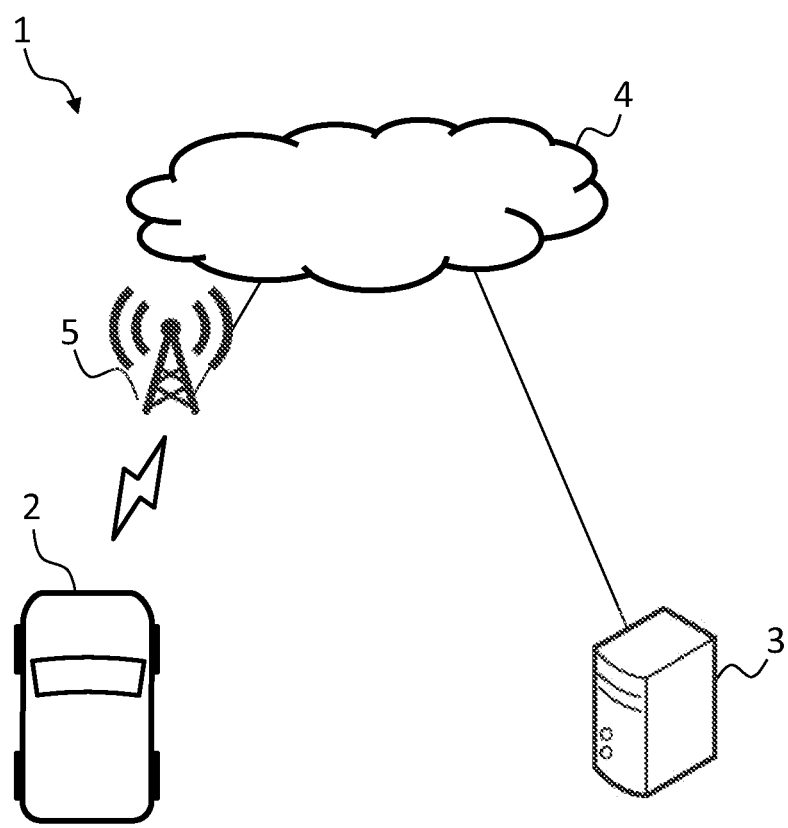
FIG. 1 schematically illustrates the configuration of a map delivering system including the apparatus for managing maps.

FIG. 1 schematically illustrates the configuration of a map delivering system including the apparatus for managing maps. The map delivering system 1 includes a vehicle 2 and a server 3. The vehicle 2 includes an electronic controller unit (ECU), which is an embodiment of the apparatus for managing maps. The vehicle 2 accesses a wireless base station 5, which is connected, for example, via a gateway to a communication network 4 connected with the server 3, thereby connecting to the server 3 via the wireless base station 5 and the communication network 4. The map delivering system 1 may include multiple vehicles 2. In the map delivering system 1, the communication network 4 may be connected with multiple wireless base stations 5.

Figure 2:
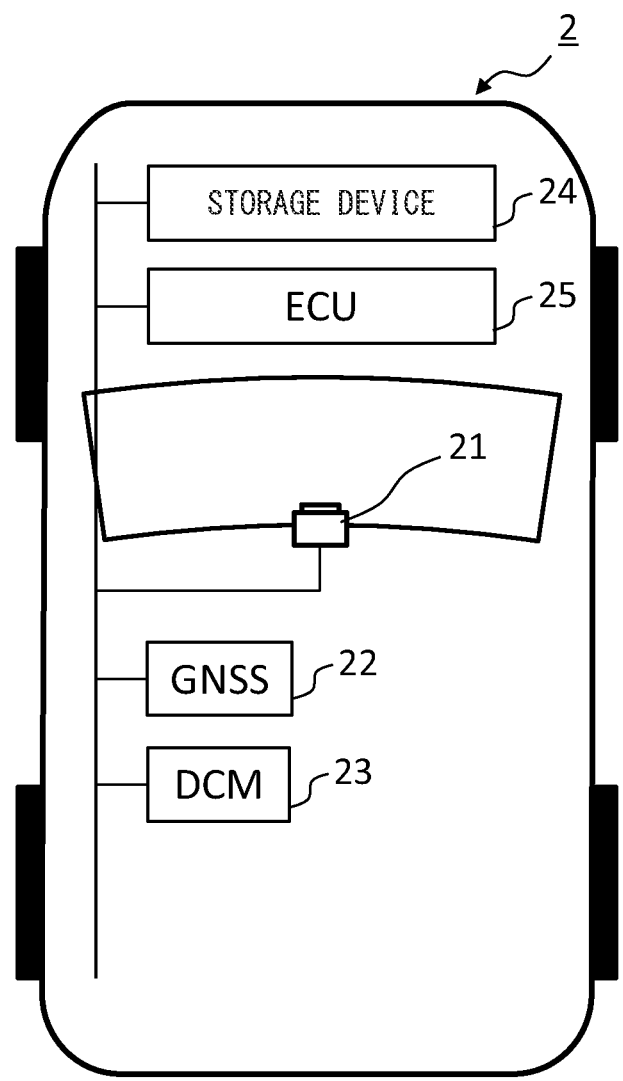
FIG. 2 schematically illustrates the configuration of a vehicle including an ECU.

FIG. 2 schematically illustrates the configuration of a vehicle including an ECU. The vehicle 2 includes a camera 21, a global navigation satellite system (GNSS) receiver 22, a data communication module (DCM) 23, a storage device 24, and an ECU 25. The camera 21, the GNSS receiver 22, the DCM 23, and the storage device 24 are connected to the ECU 25 so that they can communicate via an in-vehicle network conforming to a standard, such as a controller area network.

The camera 21, which is an example of a sensor, includes a two-dimensional detector constructed from an array of optoelectronic transducers, such as CCD or C-MOS, having sensitivity to visible light and a focusing optical system focusing an image of a target region on the two-dimensional detector. The camera 21 is mounted, for example, in the interior of the vehicle 2 so as to be oriented to the front of the vehicle 2. The camera 21 captures a region in front of the vehicle 2 every predetermined capturing period (e.g., $1/30$ to $1/10$ seconds), and generates images in which this region is shown. The images obtained by the camera 21 may be color or monochrome images. The vehicle 2 may include multiple cameras taking pictures in different orientations or having different focal lengths.

Every time generating an image, the camera 21 outputs the generated image to the ECU 25 via the in-vehicle network.

The GNSS receiver 22 receives a GNSS signal from a GNSS satellite every predetermined period, and determines the location of the vehicle 2, based on the received GNSS signal. The GNSS receiver 22 outputs a positioning signal indicating the result of determination of the location of the vehicle 2 obtained from the GNSS signal to the ECU 25 via the in-vehicle network every predetermined period.

The DCM 23, which is an example of a communication unit, is a device to perform processing for wireless communication conforming to a predetermined standard of wireless communication, such as "4G (4th Generation)" or "5G (5th Generation)." The DCM 23 accesses, for example, the wireless base station 5 to connect to the server 3 via the wireless base station 5 and the communication network 4. The DCM 23 receives a downlink radio signal from the wireless base station 5, and passes, to the ECU 25, a data-transmission requesting signal that is included in the radio signal and indicates a request for data transmission from the server 3. The DCM 23 includes data received from the ECU 25 in an uplink radio signal, and transmits the radio signal to the wireless base station 5, thereby transmitting data to the server 3.

The storage device 24, which is an example of the memory, includes, for example, a hard disk drive or a nonvolatile semiconductor memory. The storage device 24 stores maps used for automated driving control and maps for route generation used for generating a travel route. The storage device 24 receives a map from the ECU 25 via the in-vehicle network, and writes the received map in response to a writing request from the ECU 25. Each map includes road-feature information, e.g., information indicating signposts and road markings, such as lane division lines or stop lines, on roads included in a predetermined region. The maps show different regions or different types of road-feature information. The ECU 25 selects a map, depending on information required for automated driving control. The storage device 24 reads out a map in response to a request from the ECU 25 for doing so, and passes the map to the ECU 25 via the in-vehicle network.

The ECU 25 performs automated driving control of the vehicle 2, using images generated by the camera 21 and a map stored in the storage device 24. The ECU 25 also estimates usage frequencies of the respective maps stored in the storage device 24 for automated driving control, and deletes, from the storage device 24, a map whose usage frequency is less than a frequency threshold.

Figure 3:
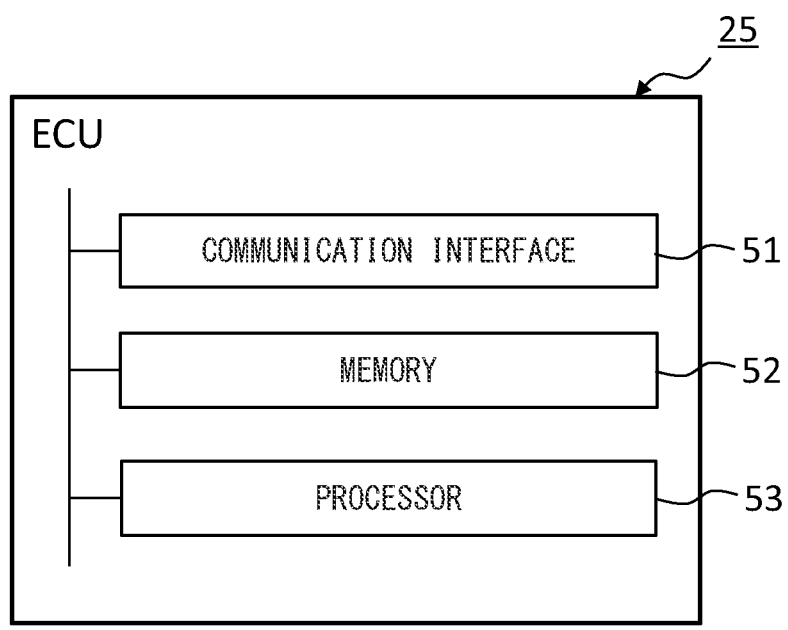
FIG. 3 illustrates the hardware configuration of the ECU.

FIG. 3 illustrates the hardware configuration of the ECU 25. The ECU 25 includes a communication interface 51, a memory 52, and a processor 53.

The communication interface 51, which is an example of a communication unit, includes a communication interface for connecting the ECU 25 to the in-vehicle network. The communication interface 51 provides received data for the processor 53, and outputs data provided from the processor 53 to an external device.

The memory 52 includes volatile and nonvolatile semiconductor memories. The memory 52 stores various types of data used for processing performed by the processor 53, such as the frequency threshold related to usage frequencies of the maps and a map management table including estimations of the usage frequencies. The memory 52 also stores various application programs, such as a map updating program for performing a map updating process.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 4:
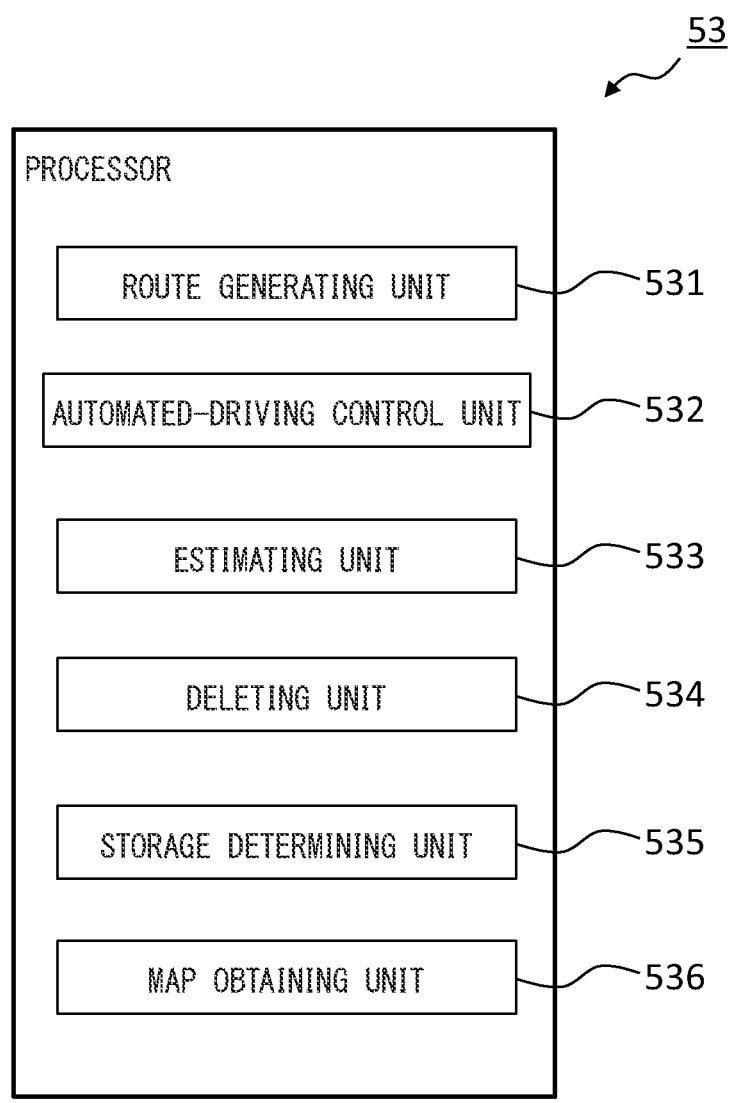
FIG. 4 is a functional block diagram of a processor included in the ECU.

FIG. 4 is a functional block diagram of the processor 53 included in the ECU 25.

The processor 53 of the ECU 25 includes, as its functional blocks, a route generating unit 531, an automated-driving control unit 532, an estimating unit 533, a deleting unit 534, a storage determining unit 535, and a map obtaining unit 536. These units included in the processor 53 are functional modules implemented by a program executed on the processor 53, or may be implemented in the ECU 25 as independent integrated circuits, microprocessors, or firmware.

The route generating unit 531 refers to a map for route generation stored in the storage device 24, and selects such sections as to connect from a start point to an end point in accordance with a predetermined route searching technique, such as Dijkstra's algorithm, thereby generating a travel route. These sections correspond to roads connecting nodes, such as intersections, in a representation of a road network. The route generating unit 531 selects sections included in a map stored in the storage device 24 to generate a travel route. When a travel route cannot be generated by selecting sections included in the maps stored in the storage device 24, the route generating unit 531 selects a section that is not included in any of the maps stored in the storage device 24, based on a map for route generation, thereby generating a travel route. The start point is, for example, the current location of the vehicle 2. The location of the vehicle 2 indicated by the latest determination result received from the GNSS receiver 22 can be used as the start point. The end point is, for example, a location designated by a driver.

Figure 5:
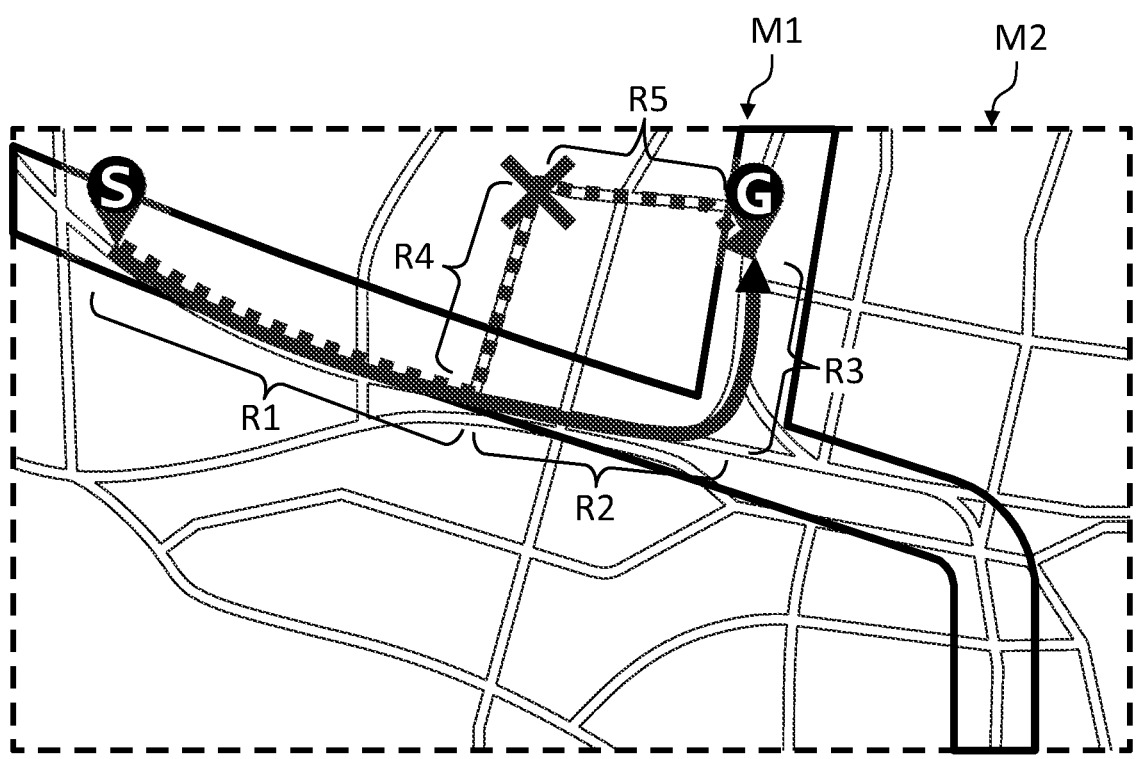
FIG. 5 is a diagram for briefly describing a route generating process.

FIG. 5 is a diagram for briefly describing a route generating process. In the example shown in FIG. 5, a map M1 includes detailed road-feature information on a region around principal roads. A map M2 includes road-feature information on principal roads and community roads. The map M1 is stored in the storage device 24, but the map M2 is not stored in the storage device 24.

The route generating unit 531 selects sections R1, R2, and R3 included in the map M1 stored in the storage device 24, thereby generating a travel route from a start point S to an end point G. Sections R4 and R5 included in the map M2 are not selected as a travel route because the map M2 is not stored in the storage device 24.

With reference to FIG. 4 again, the automated-driving control unit 532 uses a map stored in the storage device 24 to perform automated driving control of the vehicle 2. For example, the automated-driving control unit 532 determines controlled variables, such as the accelerator position, the steering angle, or the amount of braking, based on images obtained by the camera 21 and a map read out from the storage device 24, so that the vehicle 2 will travel along a travel route generated by the route generating unit 531. In accordance with the controlled variables, the automated-driving control unit 532 controls an actuator that controls the accelerator, the steering, or the brake.

The estimating unit 533 estimates a usage frequency of each of the maps, based on section information indicating sections used for automated driving control in each of the maps.

FIG. 6 illustrates an example of a map management table. The map management table 521 includes the following pieces of information associated with each other for each of the maps stored in the storage device 24: version information indicating the versions of the maps, usage of the maps, and estimated usage frequencies that are based on the usage of the respective maps. The map management table 521 is stored in the memory 52.

The map management table 521 includes, as the usage of the maps, the numbers of uses of the respective maps for automated driving control, total values of distance traveled under automated driving control, and the numbers of switches to manual driving during use of the respective maps for automated driving control, in association with the respective maps.

The distance traveled under automated driving control is an actual distance traveled continuously under automated driving control. For example, assume that a travel route is generated along which a vehicle travels through section A (15 km), section B (5 km), and section C (10 km), i.e., 30 km in total under automated driving control, and that a switch is made from automated driving to manual driving during travel through section B. In this case, the distance traveled under automated driving control is 15 km (section A)+10 km (section C)=25 km.

In the example of FIG. 6, the usage frequency is a value calculated using the following expression:

[usage frequency]=[number of uses]×([total distance]/[average of total distance])×([number of uses]−[number of switches])/(average of[number of uses]−[number of switches]). (expression 1)

Using expression 1, the estimating unit 533 calculates the usage frequencies so that the shorter a total distance traveled by using a map for automated driving control, the lower the usage frequency of this map is estimated. Using expression 1, the estimating unit 533 calculates the usage frequencies so that the greater a ratio of the number of switches from automated driving control to manual driving during use of a map to the number of uses of this map for automated driving control, the lower the usage frequency of this map is estimated.

The usage frequencies may be calculated using an expression different from expression 1. The usage frequencies are not necessarily stored in the map management table 521 in association with the respective maps. In this case, the estimating unit 533 reads out the map management table 521 from the memory 52 in response to a request for a usage frequency, and calculates the usage frequency, based on the usage stored in the map management table 521.

With reference to FIG. 4 again, the deleting unit 534 deletes, from the storage device 24, a map whose usage frequency is less than a frequency threshold.

The storage determining unit 535 determines whether a section map including sections in a travel route is stored in the storage device 24, before starting automated driving along the travel route.

The map obtaining unit 536 obtains, when the section map is not stored in the storage device 24, the section map together with its version information from the server 3 and stores them in the storage device 24. When the section map is stored in the storage device 24 and the version of the section map stored in the server 3 is newer than that of the section map stored in the storage device 24, the map obtaining unit 536 obtains a difference between the section map stored in the storage device 24 and the section map stored in the server 3 from the server 3, and stores, in the storage device 24, the difference together with version information of the section map stored in the server.

Figure 7:
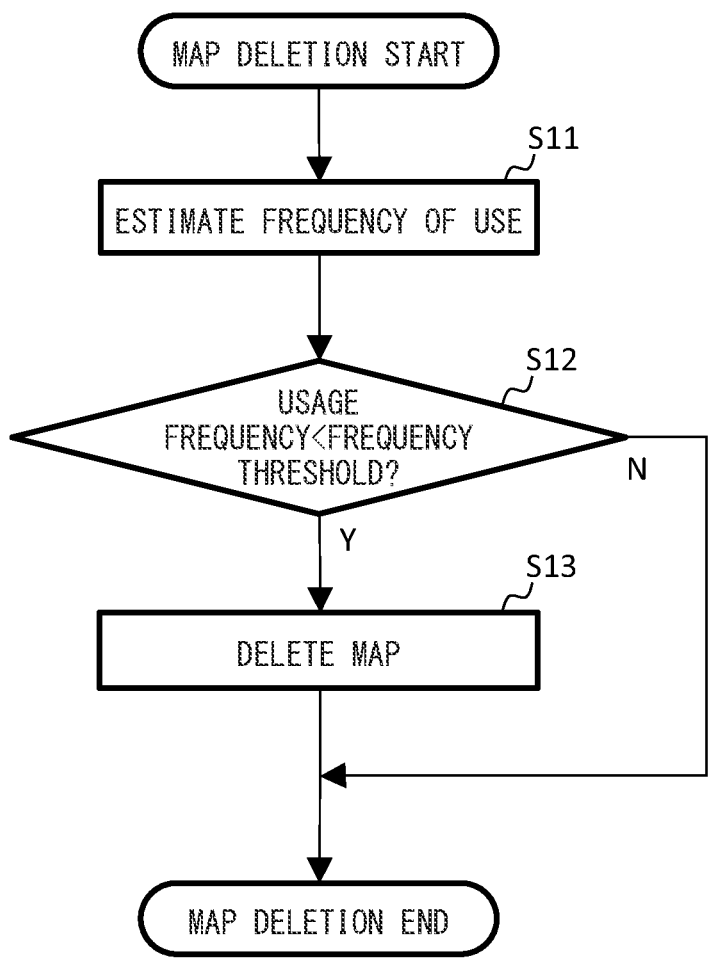
FIG. 7 is an operation flowchart of a map deleting process.

FIG. 7 is an operation flowchart of a map deleting process. The ECU 25 of the vehicle 2 repeatedly performs the map deleting process every predetermined period for each of the maps stored in the storage device 24 in accordance with the following operation flowchart.

First, the estimating unit 533 estimates a frequency of using one of the maps stored in the storage device 24 for automated driving control (step S11).

Next, the deleting unit 534 determines whether the usage frequency of this map is less than a frequency threshold (step S12). When the usage frequency is less than the frequency threshold (Yes in step S12), the deleting unit 534 deletes this map (step S13), and terminates the map deleting process regarding this map. When the usage frequency is not less than the frequency threshold (No in step S12), the deleting unit 534 terminates the map deleting process regarding this map.

Performing the map deleting process as describe above, the ECU 25 can make efficient use of a storage area of the maps in the vehicle 2.

Figure 8:
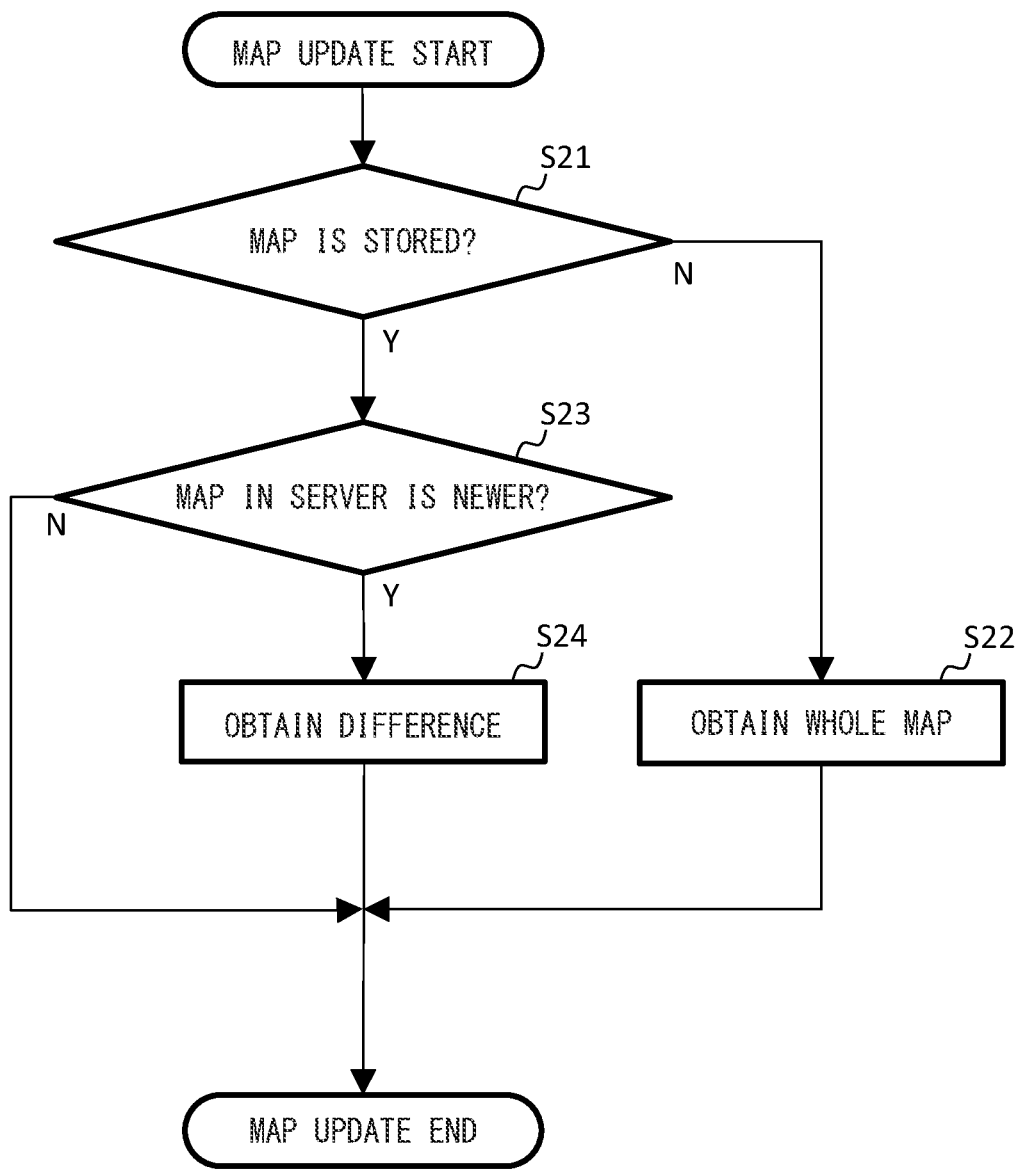
FIG. 8 is an operation flowchart of a map updating process.

FIG. 8 is an operation flowchart of a map updating process. The ECU 25 of the vehicle 2 performs the map updating process for each of the maps including a travel route in accordance with the following operation flowchart, before starting automated driving.

First, the storage determining unit 535 determines whether a map including the travel route is stored in the storage device 24 (step S21).

When such a map is not stored in the storage device 24 (No in step S21), the map obtaining unit 536 obtains a map together with its version information from the server 3, stores them in the storage device 24 (step S22), and then terminates the map updating process. When such a map is stored in the storage device 24 (Yes in step S21), the map obtaining unit 536 determines whether the version of the map stored in the server 3 is newer than that of the map stored in the storage device 24 (step S23).

When the version of the map stored in the server 3 is newer (Yes in step S23), the map obtaining unit 536 obtains a difference between the map stored in the storage device 24 and the map stored in the server 3 from the server 3, stores the difference together with version information in the storage device 24 (step S24), and then terminates the map updating process. When the version of the map stored in the server is not newer (both versions are the same) (No in step S23), the map obtaining unit 536 terminates the map updating process.

Performing the map updating process as describe above, the ECU 25 can make more efficient use of a storage area of the maps in the vehicle 2.

Figure 9:
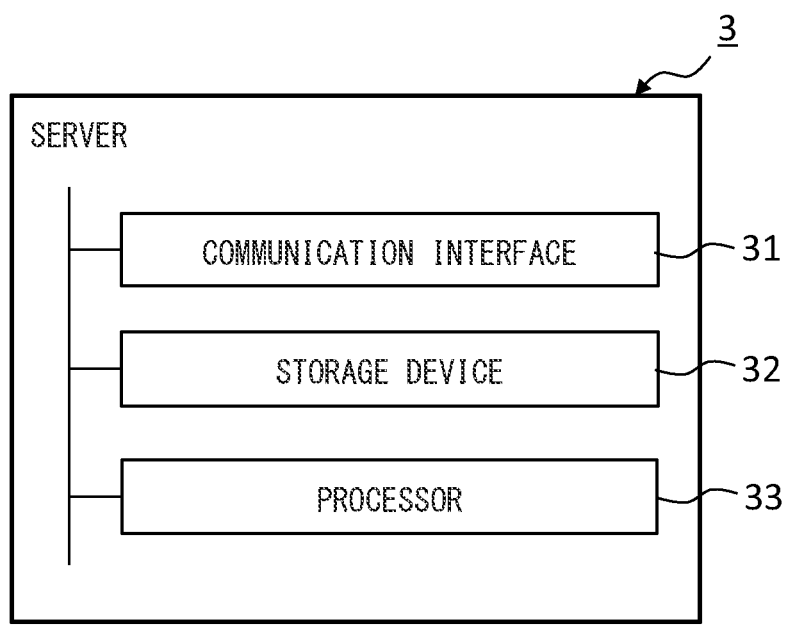
FIG. 9 illustrates the hardware configuration of a server.

FIG. 9 illustrates the hardware configuration of the server 3. The server 3 stores maps, and delivers the maps to the vehicle 2 via the communication network 4. To this end, the server 3 includes a communication interface 31, a storage device 32, and a processor 33.

The communication interface 31 includes an interface circuit for connecting the server 3 to the communication network. The communication interface 31 is configured so that it can communicate with the vehicle 2 via the communication network 4 and the wireless base station 5. More specifically, the communication interface 31 passes, to the processor 33, a map requesting signal received from the vehicle 2 via the wireless base station 5 and the communication network 4. The communication interface 31 also transmits a map received from the processor 33 to the vehicle 2 via the communication network 4 and the wireless base station 5.

The storage device 32 includes, for example, a hard disk drive, or an optical storage medium and an access device therefor. The storage device 32 stores maps together with their version information. The storage device 32 also stores differences between maps of different versions. The storage device 32 may also store a computer program executed on the processor 33 for performing processing to deliver the maps.

The processor 33 includes one or more central processing units (CPUs) and a peripheral circuit thereof. The processor 33 may further include another operating circuit, such as a logic-arithmetic unit or an arithmetic unit.

When receiving a version requesting signal from the vehicle 2, the processor 33 transmits version information stored in the storage device 32 to the vehicle 2 via the communication interface 31, the communication network 4, and the wireless base station 5.

In response to a map requesting signal received from the vehicle 2, the processor 33 transmits a map or a difference between maps stored in the storage device 32 to the vehicle 2 via the communication interface 31, the communication network 4, and the wireless base station 5.

According to a modified example, the camera 21 may be a light detection and ranging (LIDAR) sensor that obtains range images of surroundings of the vehicle 2. A range image is an image whose pixels have values depending on the distance to an object shown in the respective pixels.

Note that those skilled in the art can apply various changes, substitutions, and modifications without departing from the spirit and scope of the present disclosure.

What is claimed is:

1. An apparatus for managing maps, comprising a processor configured to:
    perform automated driving control of a vehicle using at least one map from among a plurality of maps stored in a memory included in the vehicle;
    estimate a usage frequency of each of the maps stored in the memory of the vehicle, based on section information indicating sections used for the automated driving control in each of the maps; and
    delete, from the memory, a map from among the maps whose usage frequency for the automated driving control is less than a frequency threshold,
    wherein the shorter a total distance traveled by using one of the maps for automated driving control, the lower the processor estimates the usage frequency of the one of the maps.

2. The apparatus according to claim 1, wherein the processor is further configured to:
    determine whether a section map including sections in a travel route is stored in the memory, before starting the automated driving control along the travel route;
    obtain, when the section map is not stored in the memory, the section map together with version information indicating a version of the section map from a server and store the section map and the version information in the memory; and
    obtain, when the section map is stored in the memory and version information of the section map stored in the server indicates a newer version than version information of the section map stored in the memory, a difference between the section map stored in the memory and the section map stored in the server from the server and store, in the memory, the difference together with the version information of the section map stored in the server.

3. The apparatus according to claim 2, wherein the processor is further configured to select such sections included in a map stored in the memory as to connect from a start point to an end point, thereby generating the travel route.

4. An apparatus for managing maps, comprising a processor configured to:
    perform automated driving control of a vehicle using at least one map from among a plurality of maps stored in a memory included in the vehicle;
    estimate a usage frequency of each of the maps stored in the memory of the vehicle, based on section information indicating sections used for the automated driving control in each of the maps; and
    delete, from the memory, a map from among the maps whose usage frequency for the automated driving control is less than a frequency threshold,
    wherein the greater a ratio of the number of switches from the automated driving control to manual driving during use of one of the maps to the number of uses of the one of the maps for the automated driving control, the lower the processor estimates the usage frequency of the one of the maps.

5. A method for managing maps, comprising the steps of:
    performing automated driving control of a vehicle using at least one map from among a plurality of maps stored in a memory included in the vehicle;
    estimating a usage frequency of each of the maps stored in the memory of the vehicle, based on section information indicating sections used for the automated driving control in each of the maps; and
    deleting, from the memory, a map from among the maps whose usage frequency for the automated driving control is less than a frequency threshold,
    wherein the shorter a total distance traveled by using one of the maps for automated driving control, the lower the processor estimates the usage frequency of the one of the maps.

6. A method for managing maps, comprising the steps of:
    performing automated driving control of a vehicle using at least one map from among a plurality of maps stored in a memory included in the vehicle;
    estimating a usage frequency of each of the maps stored in the memory of the vehicle, based on section information indicating sections used for the automated driving control in each of the maps; and deleting, from the memory, a map from among the maps whose usage frequency for the automated driving control is less than a frequency threshold, wherein the greater a ratio of the number of switches from the automated driving control to manual driving during use of one of the maps to the number of uses of the one of the maps for the automated driving control, the lower the processor estimates the usage frequency of the one of the maps.

\* \* \* \* \*